United States Patent [19]
Nagai et al.

[11] Patent Number: 5,277,946
[45] Date of Patent: Jan. 11, 1994

[54] ALUMINA PACKAGE FOR HERMETICALLY CONTAINING AN ELECTRONIC DEVICE THEREIN

[75] Inventors: Hiroki Nagai, Osaka; Shigeru Yamamoto, Kyoto, both of Japan

[73] Assignee: Nippon Electric Glass Co., Ltd., Otsu, Japan

[21] Appl. No.: 938,936

[22] Filed: Sep. 1, 1992

Related U.S. Application Data

[63] Continuation of Ser. No. 573,378, Aug. 24, 1990, abandoned.

[51] Int. Cl.$^5$ .................................. B32B 17/06
[52] U.S. Cl. ........................... 428/426; 428/76; 428/427; 428/432; 428/410; 428/433; 501/15; 501/17; 501/21; 501/32; 501/66; 501/905
[58] Field of Search .............. 501/15, 17, 21, 32, 501/66, 905; 428/427, 432, 410, 433, 70, 76, 426

[56] References Cited

U.S. PATENT DOCUMENTS

| | | | |
|---|---|---|---|
| 3,506,423 | 4/1970 | Morris | 428/432 |
| 4,089,694 | 5/1978 | Thomas | 501/15 |
| 4,417,913 | 11/1983 | Davis | 501/15 |
| 4,792,535 | 12/1988 | Fine | 501/66 |
| 4,839,313 | 6/1989 | Kondo | 501/15 |
| 5,045,509 | 9/1991 | Kiefer | 501/66 |

FOREIGN PATENT DOCUMENTS 62-065954  3/1987  Japan.
1-014185  3/1989  Japan.

Primary Examiner—Ellis P. Robinson
Assistant Examiner—Timothy M. Speer
Attorney, Agent, or Firm—Hopgood, Calimafde, Kalil, Blaustein & Judlowe

[57] ABSTRACT

In a borosilicate glass plate containing $Li_2O$, $Na_2O$ and $K_2O$ and for use as a window plate in an alumina package for containing a semiconductor device, $Li^+$ and $Na^+$ ions are partially ion-exchanged by $K^+$ ions in a surface of the glass plate to form a surface layer having a compressive stress of 200 Kg.f/cm$^2$ or more, in order to make a thin window glass plate for the package having a thickness of 0.7 mm or less and a sufficient mechanical strength. The glass also has a thermal expansion coefficient of $50-75 \times 10^{-7}/°$ C. over a temperature range of 30°-380° C. so as to be thermally compatible with the alumina package. The glass consists essentially of $SiO_2$ 55-64%, $Al_2O_3$ 7-20%, $B_2O_3$ 11-19%, $Li_2O$ 0-8%, $Na_2O$ 7-20%, $K_2O$ 0-4%, and RO 0.5-7% on the base of weight percent, where R is at least one of Mg, Ca, Sr, and Ba. In order to insure the ion exchange, amounts of $Li_2O$, $Na_2O$ and $K_2O$ are adjusted so that $(Li_2O + Na_2O)/(Li_2O + Na_2O + K_2O)$ is 0.7 or more.

2 Claims, 1 Drawing Sheet

ALUMINA PACKAGE FOR HERMETICALLY CONTAINING AN ELECTRONIC DEVICE THEREIN

Related Cases

This is a continuation of U.S. application Ser. No. 07/573,378 filed Aug. 24, 1990 now abandoned.

BACKGROUND OF THE INVENTION

1. Field of the Invention

The present invention relates to a glass plate for use as a cap or a window glass in an alumina package for hermetically containing, as a contained element, a semiconductor element such as an erasable programable read only memory (EPROM), an opto-electronic element like an image sensor or other opto-electronic elements.

2. Description of the Prior Art

In the prior art, the contained element is within the alumina package to which a borosilicate glass plate or cap is mounted and hermetically sealed so that the contained element is hermetically enclosed in the package. The alumina package usually has a thickness of about several millimeters, while the glass plate has a thickness of 1 mm or more to provide it with a sufficient mechanical strength so as to protect the contained element in the hermetically sealed package.

Electronic devices are required to be small-sized in order to increase a mounting density on a circuit plate. Therefore, the glass plate is also required to have a reduced thickness of 0.7 mm or less.

Usually, the alumina package is subjected to an air tight reliability test or a helium pressure test where helium gas pressure of 5 Kg.f/cm$^2$ is applied to the aluminum package hermetically sealed with the glass plate. Although the glass plate of 1 mm thickness or more is not broken in the test but the glass plate of 0.7 mm or less is broken in the test. Therefore, it is impossible to use the glass plate of 0.7 mm or less thickness as the glass cap for hermetically sealing the alumina package.

For example, Japanese Patent Publication No. 14185/1989 (Tokukou Hei (JP-B-) 1-14185, Reference I) discloses an alumina sealing ultraviolet transmitting glass which is used in alumina package for containing the EPROM, while Japanese Unexamined Patent Prepublication No. 65954/1987 (Tokukai Shô (JP-A-) 62-65954, Reference II) discloses an ultraviolet transmitting glass which is used in alumina package for containing the image sensor. When these glass plates are made to have a thickness of 0.7 mm, they are damaged during the helium pressure test although they are preferable in sealing with the alumina package.

As is known in the art, the glass plate is damaged or broken by increase of tensile stress. A chemical reinforcing method is already known as a manner for increasing strength of the glass plate. The method is called an ion exchange process in which Na$^+$ ions are ion-exchanged in the glass plate by alkaline ions, such as K$^+$ ions, having an ion radius which is larger than that of Na$^+$ ions. For example, when glass plate including Na$^+$ ions, is soaked within molten KNO$_3$, exchange reaction occurs between Na$^+$ ions of the glass plate and K$^+$ ions of molten KNO$_3$, so that K$^+$ ions enters into a surface of the glass plate As a result, a compressive stress layer is formed in the surface of the glass plate and has compressive stress which is higher than that of the other part of the glass plate because the ion radius of K$^+$ ions is larger than that of Na$^+$ ions.

The compressive stress layer serves to relax the tensile stress applied to the glass plate, so that the mechanical strength of the glass plate is increased. The compressive stress of the compressive stress layer becomes relatively higher, the mechanical strength is higher.

Thus, it is known to use the above-described chemical reinforcing method to process the glass plate used for the cap of the alumina package. However, in the prior art, the glass to be chemically reinforced is not matched in thermal expansion coefficient with the alumina (approximately equal to $70 \times 10^{-7}/°$ C.) and is therefore not suitable for hermetically sealing the alumina package. For example, Japanese Unexamined Patent Prepublication No. 251541/1986 (Tokukai Shô (JP-A-) 61-251541, Reference III) and Japanese Unexamined Patent Prepublication No. 239036/1989 (Tokukai Hei (JP-A-) 1-239036, Reference IV) disclose the fact that the chemical reinforcement is used for reinforcing glass plates. However, the glass plates disclosed in the above-mentioned references III and IV are not suitable for hermetically sealing the alumina package because the glass plates have a high thermal expansion coefficient in comparison with alumina. Consequently the glass plates may be subjected to the tensile stress and therefore suffer from cracks due to the mismatch in the thermal expansion coefficient after being sealed to the alumina package.

SUMMARY OF THE INVENTION

It is an object of the present invention to provide a borosilicate glass plate for use as a window glass in an alumina package for containing semiconductor device or other electrical and/or electronic device, which has a reduced thickness and a sufficient mechanical strength.

According to the present invention, a thin borosilicate glass plate for use in alumina package is provided. The glass plate contains as ingredients at least one alkaline metal oxide and has a thermal expansion coefficient of $50-75 \times 10^{-7}/°$ C. over a temperature range of 30°-380° C. The glass plate is characterized by a surface layer where the alkalline metal ions of the alkaline metal oxide are partially ion-exchanged by another ions having a radius larger than that of the first-mentioned alkaline metal ions to make the surface layer have a compressive stress of 200 Kg.f/cm$^2$ or more.

The glass plate has a thickness of 0.7 mm or less. And the glass plate may have a transmission of 40% or more through 1 mm thickness of the glass for ultraviolet light having a wavelength of 253.7 nm.

A typical glass plate according to the present invention is substantially free from ZnO and consists essentially of SiO$_2$ 55-64%, Al$_2$O$_3$ 7-20%, B$_2$O$_3$ 11.5-14.3%, Li$_2$O 0-8%, Na$_2$O 7-20%, K$_2$O 0-4%, and RO 0.5-7% on the base of weight percent, where R is at least one of Mg, Ca, Sr, and Ba. (Li$_2$O+Na$_2$O)/(Li$_2$O+Na$_2$O+K$_2$O) is adjusted to be 0.7 or more in order to insure the ion-exchange.

BRIEF DESCRIPTION OF THE DRAWINGS

A single figure is a sectional view of an alumina package hermetically sealed by a glass plate according to the present invention.

DESCRIPTION OF THE INVENTION

Figure 1:
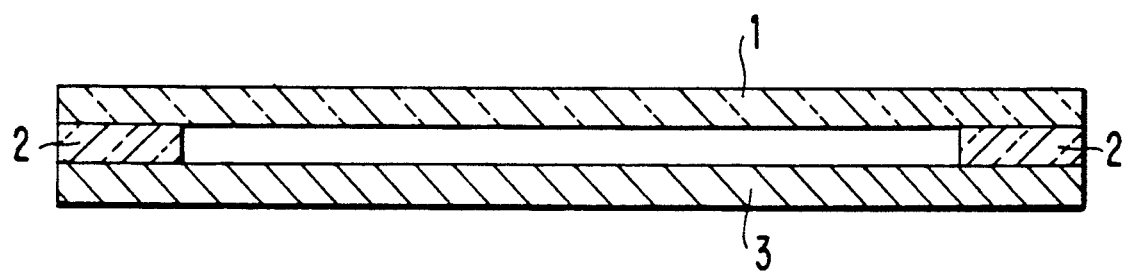

The glass plate according to the present invention has a thermal expansion coefficient of $50\text{-}75 \times 10^{-7}/°$ C. When it is less than $50 \times 10^{-7}/°$ C., the alumina sealed with the glass plate is supplied with a large tensile force caused by the glass plate and is damaged. When it is larger than $75 \times 10^{-7}/°$ C., the glass plate is subjected to a large tensile force by the alumina and is damaged.

In the present invention, the glass plate is processed by ion-exchange to form a compressive stress surface layer therein having the compressive stress of 200 Kg.f/cm$^2$. Therefore, the glass plate can be made with a reduced thickness such as 0.7 mm or less with insurance of the sufficient mechanical strength to endeavour the 5 Kg.f/cm$^2$ helium pressure test.

A typical glass plate of the present invention is limited in the ingredients and the amounts of those ingredients. The reason why they are limited will be described below.

$SiO_2$ is an ingredient of the glass plate and is contained by an amount of 55-64% on the base of the weight percent. $SiO_2$ less than 55% disadvantageously makes the thermal expansion coefficient of the glass excessively larger, as well as makes a weatherability character worse so that deterioration tends to be caused in the surface of the glass by aging. When $SiO_2$ is more than 64%, the thermal expansion coefficient and meltability of the glass becomes excessively smaller.

$Al_2O_3$ is remarkably useful for facilitating the ion exchange and is used by an amount of 7-20%. When $Al_2O_3$ is less than 7%, the intended effect is not taken. $Al_2O_3$ more than 20% lowers meltability of the glass.

$B_2O_3$ is a fusing agent for facilitating the melt of the glass without increase of the thermal expansion coefficient. An amount of $B_2O_3$ is limited to 11.5-14.3%. When $B_2O_3$ is less than 11.5%, the intended effect is not taken as the fusing agent. When $B_2O_3$ is more than 14.3%, it much evaporates from the surface of the glass at melting of the glass. As a result, a deteriorated layer is produced in the surface of the glass, so that it is difficult to make a homogeneous glass. In addition, the weatherability character of the glass becomes worse.

$Li_2O$ may be used for adjusting the thermal expansion coefficient and for remarkably facilitating the melt of the glass. The ion exchange is carried out between Li$^+$ ions of $Li_2O$ and each of Na$^+$ ions and K$^+$ ions. As a result, a compressive stress layer is formed in the surface of the glass to reinforce the glass. An amount of $Li_2O$ is 0-8%. $Li_2O$ more than 8% much evaporates from the surface of the glass at melting of the glass. Therefore, it is difficult to obtain a homogeneous glass and, in addition, the weatherability character of the glass becomes worse.

$Na_2O$ is for adjusting the thermal expansion coefficient and for facilitating the melt of the glass. The ion exchange is carried out between Na$^+$ ions of $Na_2O$ and K$^+$ ions. As a result, the compressive stress layer is formed in the surface of the glass and reinforces the glass. An amount of $Na_2O$ is 7-20%. Use of $Na_2O$ less than 7% makes the thermal expansion coefficient excessively smaller and, in addition, it is very difficult to reinforce the glass by the ion exchange When $Na_2O$ is used by more than 20%, the thermal expansion coefficient of the glass becomes excessively large.

$K_2O$ is also used for adjusting the thermal expansion coefficient and for facilitating the melt of the glass. However, $K_2O$ is limited to be less than 4% in order to insure the ion exchange between Na$^+$ ions in the glass and K$^+$ ions in the molten $K_2O$ salt. In order to facilitate a high ion exchange efficiency, it is advantageous that a rate is determined about $Li_2O$, $Na_2O$, and $K_2O$ as follows:

$K_2O/(Li_2O+Na_2O+K_2O)$ is less than 0.3.

In other words, $(Li_2O+Na_2O)/(Li_2O+Na_2O+K_2O)$ is more than 0.7.

An alkaline earth metal oxide RO (MgO, CaO, SrO, and BaO) is an ingredient for improving the weatherability character of the glass and is used by an amount of 0.5-7%. When the alkaline earth metal oxide is less than 0.5%, the above-mentioned effect is not taken. When the alkaline earth metal oxide is more than 7%, the ion exchange is not so well performed.

In addition, it is preferable that ZnO is not included. This is because inclusion of ZnO results in lowering of the compressive stress of the glass surface caused by the ion exchange.

TABLE 1

| Ingredients | Samples |  |  |  |  |  |
|---|---|---|---|---|---|---|
|  | 1 | 2 | 3 | 4 | 5 | 6 |
| SiO$_2$ | 60.3 | 6.28 | 56.0 | 55.5 | 61.0 | 61.0 |
| Al$_2$O$_3$ | 10.7 | 10.2 | 15.5 | 19.0 | 8.0 | 8.0 |
| B$_2$O$_3$ | 14.3 | 13.8 | 12.5 | 11.5 | 11.5 | 18.5 |
| Li$_2$O | — | — | — | — | — | — |
| Na$_2$O | 11.1 | 10.6 | 9.7 | 9.8 | 13.8 | 9.0 |
| K$_2$O | 1.0 | 0.5 | 0.3 | 2.0 | 0.2 | 1.5 |
| MgO | 2.6 | 2.1 | 1.0 | — | — | — |
| CaO | — | — | 2.0 | 2.2 | — | — |
| SrO | — | — | 3.0 | — | 5.5 | — |
| BaO | — | — | — | — | — | 2.0 |
| ZnO | — | — | — | — | — | — |
| Thermal Expansion Coefficient ($\times 10^{-7}/°$C.) (30-380° C.) | 69.7 | 66.2 | 72.5 | 72.0 | 74.3 | 59.0 |
| Chemical Treatment |  |  |  |  |  |  |
| Temp. (°C.) | 480 | 490 | 470 | 490 | 470 | 480 |
| Time (hr) | 10 | 16 | 8 | 15 | 8 | 11 |
| Compressive Stress (kgf/cm$^2$) | 5050 | 4550 | 5100 | 5100 | 4850 | 4550 |
| Helium Pressure Test (Destroyed Number/Tested Number) | 0/20 | 0/20 | 0/20 | 0/20 | 0/20 | 0/20 |
| Heat Shock Test (Destroyed Number/Tested Number) | 0/20 | 0/20 | 0/20 | 0/20 | 0/20 | 0/20 |
| Ultraviolet Transmittance (%) (Wavelength 253.7 nm) | 86 | 83 | 84 | 85 | 82 | 83 |

TABLE-2

| Ingredients | Samples |  | Comparative Samples |  |  |  |
|---|---|---|---|---|---|---|
|  | 7 | 8 | 9 | 10 | 11 | 12 |
| SiO$_2$ | 62.0 | 63.2 | 60.1 | 68.2 | 68.0 | 61.0 |
| Al$_2$O$_3$ | 10.0 | 9.2 | 8.4 | 5.4 | 7.5 | 8.0 |
| B$_2$O$_3$ | 11.9 | 11.6 | 10.5 | 12.0 | — | 16.0 |
| Li$_2$O | — | 4.2 | — | — | — | 9.0 |
| Na$_2$O | 11.1 | 8.4 | 10.0 | 8.7 | 14.0 | 1.5 |
| K$_2$O | 1.0 | 1.3 | 5.0 | 2.7 | 1.5 | — |
| MgO | 4.0 | — | 4.0 | — | 2.5 | — |
| CaO | — | 2.1 | — | 0.5 | 6.5 | — |
| SrO | — | — | 2.0 | — | — | — |
| BaO | — | — | — | 2.5 | — | 2.0 |
| ZnO | — | — | — | — | — | 2.5 |
| Thermal Expansion Coefficient ($\times 10^{-7}/°$C.) (30-380° C.) | 68.3 | 74.0 | 67.4 | 66.2 | 92.0 | 68.0 |
| Chemical Treatment |  |  |  |  |  |  |

TABLE-2-continued

| Ingredients | Samples | | Comparative Samples | | | |
|---|---|---|---|---|---|---|
| | 7 | 8 | 9 | 10 | 11 | 12 |
| Temp. (°C.) | 440 | 440 | — | 450 | 480 | 480 |
| Time (hr) | 8 | 7 | — | 5 | 10 | 11 |
| Compressive Stress (kgf/cm$^2$) | 5100 | 3200 | 0 | 50 | 4200 | 185 |
| Helium Pressure Test (Destroyed Number/ Tested Number) | 0/20 | 0/20 | 15/20 | 7/20 | 0/20 | 2/20 |
| Heat Shock Test (Destroyed Number/ Tested Number) | 0/20 | 0/20 | 0/20 | 0/20 | 0/20 | 0/20 |
| Ultraviolet Transmittance (%) (Wavelength 253.7 nm) | 82 | 84 | 83 | 83 | 81 | 83 |

Referring to Tables 1 and 2, illustration is made about ingredients and properties of each of samples Nos. 1 to 8 according to embodiments of this invention and comparative samples Nos. 9 to 12. Each of the samples Nos 1 to 12 is made in the following manner.

Materials for making glass were mixed into a mixed material at first so that the mixed material have ingredients shown in Tables 1 and 2. The mixed material was melted into a molten glass for four hours at a temperature of 1550° C. in a platinum crucible. After the melting operation, the molten glass was spread on a carbon plate and annealed to form a glass plate. The glass plate was examined in a thermal expansion coefficient test, and the examined result is shown in Tables 1 and 2.

The molten glass was also formed into a thin glass plate having a size of 20×10×0.35 mm. The glass plate was soaked in KNO$_3$ under the chemical treatment conditions shown in Tables 1 and 2, in order to produce a compressive stress layer by the ion exchange in a surface of the glass plate. Thereafter, a compressive surface stress was measured by the use of a surface stress measuring equipment which is commercially available (for example, a measuring equipment of the trade name FSM-60 manufactured by TOSHIBA Corporation in Japan). Measured values are shown in Tables 1 and 2.

Subsequently, coating of a frit glass was carried out on a peripheral of the glass plate. The glass plate is hermetically attached to an alumina base plate shown in the figure to form a sample package. In the figure, the glass plate is represented by 1 while the frit glass is represented by 2. The alumina base plate is represented by 3. A helium pressure test and a thermal shock test were carried out for the sample package The measured result is also shown in Tables 1 and 2.

On the other hand, the molten glass was formed into a different glass plate having a different size of 20×10×1 mm. An ultraviolet ray transmittance for a wavelength of 253.7 nm was measured for the different glass, and the measured data are shown in Tables 1 and 1.

As is apparent from Tables 1 and 2, the samples Nos. 1 to 8 according to the embodiments of this invention are superior to the comparative samples Nos. 9–12 in hermetic sealing against the alumina plate because each of the samples Nos. 1 to 8 has a thermal expansion coefficient between 66.2 and 74.3×10$^{-7}$/° C.

Furthermore, the surface compressive stress layer is produced in the surface of the glass plate by the ion exchange, and has a surface compressive stress which is greater than 4550 kg.f/cm$^2$. This means that the samples Nos. 1 to 8 glass are suitable for the ion-exchanging processing.

Furthermore, each of the samples Nos. 1 to 8 is not subjected to damages on carrying out the helium pressure test and the thermal shock test and, therefore, has a high mechanical strength.

It is noted that each of the samples Nos. 1 to 8 has a high ultraviolet ray transmittance which is greater than 82% for the ultraviolet ray having a wavelength of 253.7 nm.

It is also noted from Tables 1 and 2 that damages occur in the comparative sample No. 9 (which is not subjected to the ion-exchanging processing) and the comparative sample No. 10 (which has the surface compressive stress of 50 kg.f/cm$^2$) on carrying out the helium pressure test. Inasmuch as the sample No. 11 has a thermal expansion coefficient which is greater than that of alumina, damages occur in the sample No. 11 on carrying out the heat shocking test. Inasmuch as the sample No. 12 comprises ZnO, the sample No. 12 has not a high surface compressive stress. As a result, damages occur in the sample No. 11 at the helium pressure test.

The thermal expansion coefficients shown in Tables 1 and 2 are obtained by measuring a mean value of the thermal coefficients between 30° and 380° C. by the use of a differential thermal dilatometer.

What is claimed is:

1. A package for hermetically containing an electronic device therein, said package comprising:
    an alumina base plate on which said electronic device can be mounted; and
    a glass plate window mounted to said alumina base plate so as to hermetically contain said electronic device, said glass plate window having a thickness of 0.7 mm or less, a thermal expansion coefficient in the range of about 50×10$^{-7}$/° C. to about 75×10$^{-7}$/° C. over a temperature range from about 30° C. to about 380° C., and a transmission of 40% or more through 1 mm thickness of said glass plate window for ultraviolet radiation having a wavelength of 253.7 nanometers, said glass plate window being free from ZnO and consisting essentially of SiO$_2$ 55–64%, Al$_2$O$_3$ 7–20%, B$_2$O$_3$ 11.5–14%, Li$_2$O 0–8%, Na$_2$O 7–20%, K$_2$O 0–4% and RO 0.5–7% on the basis of weight percent, R being at least one of Mg, Ca, Sr, and Ba, and said glass plate window having a surface layer in which alkaline metal ions are partially ion-exchanged with another alkaline metal ion having an ion radius larger than that or said first mentioned alkaline metal ions, so as to provide said surface layer with a compressive stress of at least 200 Kg.f/cm$^2$.

2. The package of claim 1, wherein the ratio (Li$_2$O+Na$_2$O))/(Li$_2$O+Na$_2$O+K$_2$O) is 0.7 or more.

* * * * *

UNITED STATES PATENT AND TRADEMARK OFFICE
CERTIFICATE OF CORRECTION

PATENT NO. : 5,277,946
DATED : January 11, 1994
INVENTOR(S) : Hiroshi Nagai et al.

It is certified that error appears in the above-identified patent and that said Letters Patent is hereby corrected as shown below:

On the title page, insert item:

--[30] Foreign Application Priority Data

August 24, 1989    Japan    217884/1989

December 27, 1989    Japan    343741/1989

August 21, 1990    Japan    218083/1990

Claim 1, column 6, line 51, "11.5-14%"

should be --11.5-14.3%--.

Signed and Sealed this

Twenty-eighth Day of June, 1994

Attest:

BRUCE LEHMAN

*Attesting Officer*    *Commissioner of Patents and Trademarks*